(12) United States Patent
Schreib

(10) Patent No.: US 6,347,223 B1
(45) Date of Patent: Feb. 12, 2002

(54) METHOD AND RECEIVER FOR DATA TRANSMISSION

(75) Inventor: Franz Schreib, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/456,712

(22) Filed: Dec. 9, 1999

Related U.S. Application Data

(63) Continuation of application No. PCT/DE98/01486, filed on May 29, 1998.

(30) Foreign Application Priority Data

Jun. 9, 1997 (DE) .......................................... 197 24 248

(51) Int. Cl.[7] ............................................. H04M 11/00
(52) U.S. Cl. ....................... 455/403; 455/450; 370/277; 370/292
(58) Field of Search .................... 455/403, 424, 455/425, 450, 31.1, 37.1, 39, 509; 370/277, 278, 282, 292; 377/231, 225, 295, 316, 340, 365, 368

(56) References Cited

U.S. PATENT DOCUMENTS

| | | | |
|---|---|---|---|
| 5,127,051 A | | 6/1992 | Chan et al. |
| 5,212,684 A | * | 5/1993 | MacNamee et al. ........... 370/24 |
| 5,293,401 A | | 3/1994 | Serfaty |
| 6,002,716 A | * | 12/1999 | Meyer et al. ............... 375/231 |
| 6,026,130 A | * | 2/2000 | Rahmatullah et al. ....... 375/340 |
| 6,084,862 A | * | 7/2000 | Bjork et al. ................. 370/292 |
| 6,084,868 A | * | 7/2000 | Piirainen ..................... 370/345 |
| 6,094,461 A | * | 7/2000 | Heron ......................... 375/317 |
| 6,154,661 A | * | 11/2000 | Goldburg ..................... 455/562 |

FOREIGN PATENT DOCUMENTS

| | | |
|---|---|---|
| DE | 43 26 749 A1 | 2/1995 |
| DE | 196 16 829 C1 | 4/1997 |
| EP | 0 767 543 A2 | 4/1997 |

OTHER PUBLICATIONS

"Channel Equalization for Block Transmission Systems" (Kaleh), 8272 IEEE Journal on Selected Areas in Communications, vol. 13, No. 1, New York 1995, pp. 111–121.

"An Efficient Adaptive Circular Viterbi Algorithm for Decoding Generalized Tailbiting Convolutional Codes" (Cox et al.), 8105 IEEE Transactions on Vehicular Technology.

"Mobile Radio Communications" (Steele), Pentech Press, London.

* cited by examiner

*Primary Examiner*—William Trost
*Assistant Examiner*—Congvan Tran
(74) *Attorney, Agent, or Firm*—Herbert L. Lerner; Laurence A. Greenberg; Werner H. Stemer

(57) ABSTRACT

A method and a device are specified for data transmission via an air interface between radio stations in a radio communications system. Data to be transmitted are grouped into message blocks at the transmitting end, the message blocks respectively containing additional symbols of a training sequence. Thereupon, at least two message blocks with different training sequences are simultaneously transmitted on one channel, whereupon the data of the at least two message blocks are detected at the receiving end with knowledge of the at least two training sequences.

19 Claims, 7 Drawing Sheets

| | &2 | |1 | &1 | |2 |
|---|---|---|---|---|
| 00 | 00 | 01 | 01 | 10 |
| 01 | 00 | 01 | 01 | 11 |
| 10 | 10 | 11 | 11 | 10 |
| 11 | 10 | 11 | 11 | 11 |

Tab 4

Fig 9

Tab 1

| Message block 1 | | | | Message block 2 | | | |
|---|---|---|---|---|---|---|---|
| 128 | 64 | 32 | 16 | 8 | 4 | 2 | 1 |
| y3 | y2 | y1 | y0 | x3 | x2 | x1 | x0 |

Fig 10

Tab 2

| Message block 1 | | | | | Message block 2 | | | | |
|---|---|---|---|---|---|---|---|---|---|
| 256 | 128 | 64 | 32 | 16 | 16 | 8 | 4 | 2 | 1 |
| y4 | y3 | y2 | y1 | y0 | x4 | x3 | x2 | x1 | x0 |

Fig 11

Tab 3

| y4 | x4 | Transition |
|---|---|---|
| 0 | 0 | 0 |
| 0 | 1 | 1 |
| 1 | 0 | 2 |
| 1 | 1 | 3 |

METHOD AND RECEIVER FOR DATA TRANSMISSION

CROSS-REFERENCE TO RELATED APPLICATION

This is a continuation of copending International application PCT/DE/98/01486, filed May 29, 1998, which designated the United States.

BACKGROUND OF THE INVENTION

FIELD OF THE INVENTION

The invention lies in the telecommunications field. More specifically, the invention relates to a method and a device for data transmission via an air interface between radio stations in a radio communications system.

Radio communications systems, also referred to as wireless systems, serve to transmit data with the aid of electromagnetic waves via an air interface between a transmitting and a receiving radio station. An example of a radio communications system is the well-known GSM mobile radio network, in which a channel formed by a narrowband frequency band and a time slot is provided in each case for transmitting a subscriber signal. Due to the fact that a subscriber signal is separated on a channel in frequency and time from remaining subscriber signals, the receiving radio station can detect the data of this subscriber signal.

It has become known from the GSM mobile radio system to make use of training sequences embedded in the data of the subscriber signal which are known at the receiving end and serve to determine channel coefficients. The channel coefficients thereby simulate the radio transmission channel and facilitate the compensation of interference during subsequent data detection.

The frequency band available to the GSM mobile radio network is limited and leads increasingly to capacity bottlenecks, in particular in areas of high subscriber density. The capacity of the GSM mobile radio network is thereby limited by the number of the channels possible in a radio cell. A possibility of increasing this capacity is to introduce a so-called half rate transmission. The half rate transmission presupposes for voice an improved source coding so that only half of the previously required time slots suffice to transmit the same quantity of data.

Half-rate coding, however, can be applied only to voice information.

SUMMARY OF THE INVENTION

It is accordingly an object of the invention to provide a method and a receiving device in a data transmission system, which overcomes the above-mentioned disadvantages of the heretofore-known devices and methods of this general type and which achieves an increase in capacity independently of the significance of the data to be transmitted.

With the foregoing and other objects in view there is provided, in accordance with the invention, a method of transmitting data via an air interface between radio stations in a radio communications system, which comprises the following steps:

grouping data to be transmitted into message blocks at a transmitting end, the message blocks respectively containing additional symbols of a training sequence;

simultaneously transmitting at least two message blocks with mutually different training sequences on a channel designated by a frequency band and a time slot;

carrying out at least two channel estimates per channel at a receiving end with knowledge of the different training sequences; and respectively detecting the data of the at least two simultaneously transmitted message blocks for each channel based on the separate channel estimates.

In other words, the data to be transmitted are grouped into message blocks at the transmitting end and the message blocks are provided with respective additional symbols of a training sequence. Thereupon, at least two message blocks with different training sequences are simultaneously transmitted on a channel, whereupon the data are detected at the receiving end with knowledge of the at least two training sequences. While the summary and the detailed description generally refer to at least two message blocks, the method can also be applied for a larger number of message blocks.

By virtue of the fact that it is ensured when selecting the training sequences that the latter always differ from one another in conjunction with simultaneously transmitted message blocks, the subscriber signals can be separated at the receiving end by means of this characteristic of a message block. The data to be transmitted in the two message blocks can be arbitrary in this case. There is no need to heed any restrictions for these data and the ratio of the individual symbols to one another. Thus, when data of the two message blocks are evaluated the method according to the invention achieves an increase in capacity at least by a factor of 2 which is not limited only to voice information, but can also be applied to further services.

In accordance with an added feature of the invention, the data of the at least two message blocks are detected at the receiving end.

In accordance with an alternative feature of the invention, the data of one message block are detected at the receiving end, and the knowledge of the further message block is used to improve the detection. An improvement in the interference immunity of the connection is thereby achieved. The interference from neighboring cells can thus also be compensated. Consequently, it is possible to permit relatively severe interference in the system, as a result of which either an improved reuse of frequency or a higher subscriber density becomes possible.

In accordance with another feature of the invention, radio stations simultaneously transmitting on one channel are synchronized, and according to a further feature the received data which are simultaneously transmitted in the same channel are synchronized. Different propagation paths of the transcriber signals lead to different instants of arrival at the receiving radio station, so that it is particularly important to use synchronization to tune the arrival of the two message blocks to one another, and thus to facilitate the following steps for channel estimation and data detection. The synchronization is prepared by signaling to the transmitting radio stations, which can thereupon set the transmission instant. The synchronization can also be performed at the receiving end; in this case, there is no need to signal to the transmitting radio stations.

In accordance with a further feature of the invention, the synchronizing step comprises setting a temporal deviation in an arrival of the at least two message blocks at the radio station at the receiving end which is smaller than a symbol length. In other words, a temporal deviation in the arrival of the at least two message blocks at the radio station at the receiving end which is smaller than a symbol length is advantageously set by the synchronization. Thus, if the transmission instants of the transmitting radio station are set in each case of signaling in such a way that there are a slight deviation between the instants of the occurrence of the at least two message blocks, it is possible to keep a bit error rate of the data transmission low by improved detection.

In accordance with again an added feature of the invention, at least two training sequences are allocated to a transmitting radio station. A doubled data rate is rendered possible for this radio station by this measure. There is no need for additional outlay on hardware for this radio station, all that is required is to adapt the signal processing as appropriate in the receiving radio station. This can be performed, as the case may be, by reprogramming the appropriate signal processor.

If the radio stations are designed as mobile stations or base stations of a digital mobile radio network, the direction of transmission from the mobile station to the base station is designated as uplink direction, and the direction of transmission from the base station to the mobile station is designated as downlink direction. In accordance with a development of the invention, different transmission rates are used in the uplink direction and downlink direction.

Consequently, asymmetrical services are possible which do better justice to the particular features of the requirements placed on the data to be transmitted. It is advantageous for message blocks of higher data rates to be used in the uplink direction than the downlink direction. That is to say, the mobile stations receive as previously, but they transmit simultaneously with other mobile stations on one channel, and thereby increase the data rate in the uplink direction. Consequently, there is no need to change the circuit engineering of mobile stations; it is possible to achieve a doubling of the capacity of a data transmission in the uplink direction in the base station by appropriate adaptation of the signal processing.

The method according to the invention exhibits particular advantages when the transmitted data are transmitted in accordance with a packet data service (GPRS General Packet Radio Services). In the case of this service, the data rates must be easily changeable, and flexible utilization of the radio resources of the air interface must be possible. This can be implemented by means of the method according to the invention.

In accordance with again a further feature of the invention, the detecting step comprises evaluating the at least two training sequences to obtain a message block-related channel estimation.

With the above and other objects in view there is provided, in accordance with the invention, a receiving device for data transmitted via an air interface between radio stations in a radio communications system, comprising:

a channel estimator for simultaneous channel estimation of at least two message blocks simultaneously transmitted in one channel of an air interface designated by a frequency band and a time slot, the channel estimator evaluating for each channel at least two connection-specific training sequences transmitted within the message blocks in addition to the data, and determining channel coefficients in each case; and a detector connected to the channel estimator for respectively detecting data for the at least two message blocks with knowledge of the at least two separately determined channel coefficients.

In accordance with yet an additional feature of the invention, the channel estimator is programmed to simultaneously determine at least two sets of channel coefficients by minimizing, for received training sequences, a deviation of received data relative to reference data generated in at least two channel models with channel coefficients.

In accordance with yet another feature of the invention, the detector is programmed to consider at least four transitions from previous detection states $\Gamma_i$ to a new detection state $\Gamma''$ for applying Viterbi algorithm, and to determine the new detection state in accordance with the equation $\Gamma''=\min (\Gamma_i+\Delta_i)|_{i=0\ldots 3}$, whereby $\Delta_i$ is a Euclidean spacing between a received symbol and a reference symbol.

In accordance with a concomitant feature of the invention, at least one decoder is provided which takes account of soft outputs $s'_1$, $s'_2$ calculated according to $$s'_1=(\Gamma_{imin\&2}+\Delta_{imin\&2})-(\Gamma_{imin|1}+\Delta_{imin|1}) \text{ and } s'_2=(\Gamma_{imin\&1}+\Delta_{imin\&1})-(\Gamma_{imin|2}+\Delta_{imin|2}).$$

As noted above, the device is advantageously utilized in a mobile station or a base station of a digital mobile radio network.

Other features which are considered as characteristic for the invention are set forth in the appended claims.

Although the invention is illustrated and described herein as embodied in method and receiver for data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 9 is a table describing the relationship between the transmitted data symbol and a state number;

FIG. 10 is a table with transition numbers;

FIG. 11 is a table with local numbers with a transition; and

DESCRIPTION OF THE PREFERRED EMBODIMENTS

Figure 1:
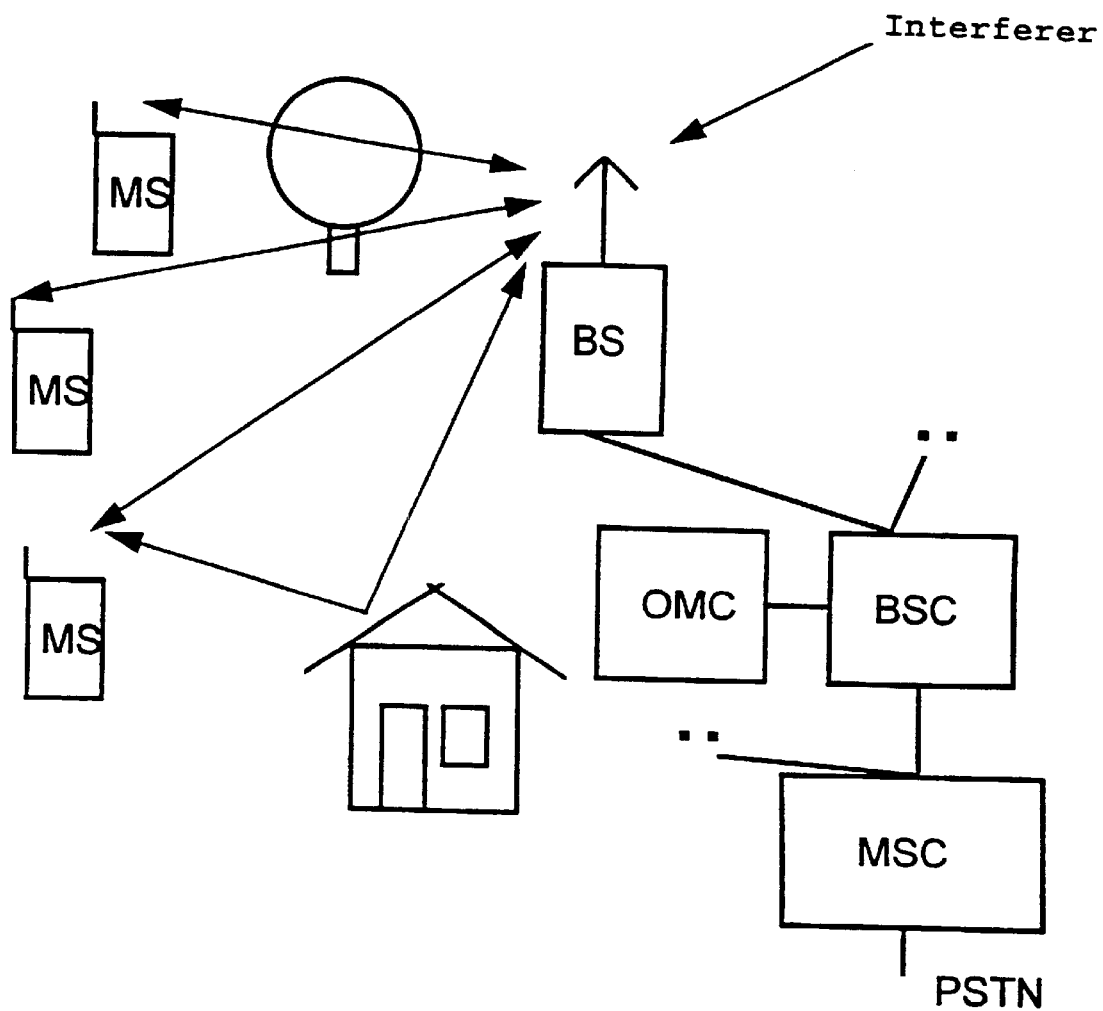
FIG. 1 is a block diagram of a radio communications system.

Referring now to the figures of the drawing in detail and first, particularly, to FIG. 1 thereof, there is seen a radio communications system which corresponds in its structure to a known GSM mobile radio network. The network comprises a multiplicity of mobile switching centers MSC which are networked and/or provide access to a fixed network PSTN. Furthermore, these mobile switching centers MSC are connected to in each case at least one base station controller BSC. Each base station controller BSC in turn permits connection to at least one base station BS, and undertakes to manage the radio resources of the connected base station BS. Such a base station BS is a radio station which can establish a communication link to mobile stations MS via an air interface.

FIG. 1 shows by way of example three links for transmitting data, which can constitute useful information and signaling information, between three mobile stations MS and a base station BS (e.g. direct line-of-sight connection, direct connection through a tree, and reflection via a building). An operating and maintenance center OMC implements control and maintenance functions for the mobile radio network or for parts thereof. The functionality of this structure can also be transferred to other radio communications systems in which the invention can be used.

Figure 2:
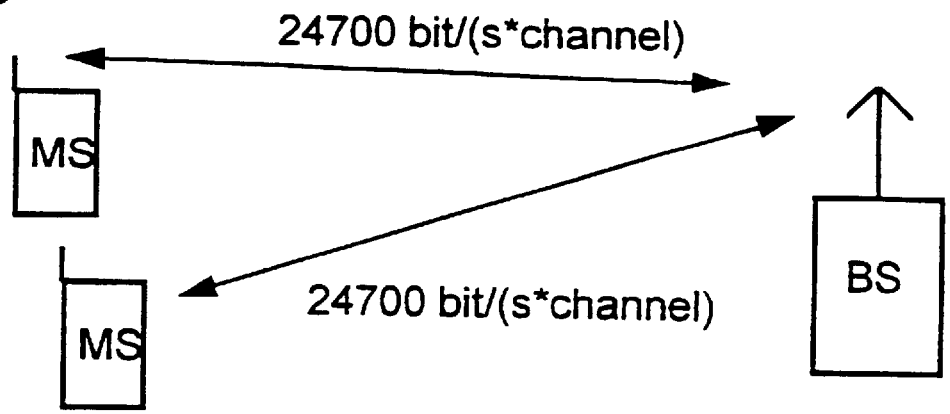
FIGS. 2 to 4 are diagrams showing different variants of data rates for the data transmission according to the invention.
Figure 3:
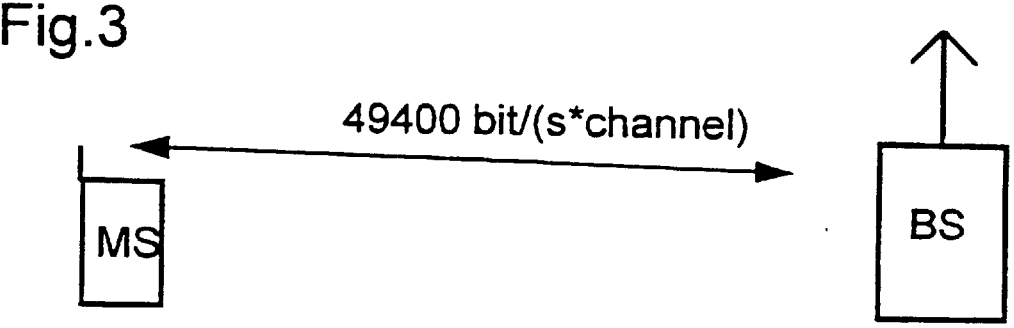
Figure 4:
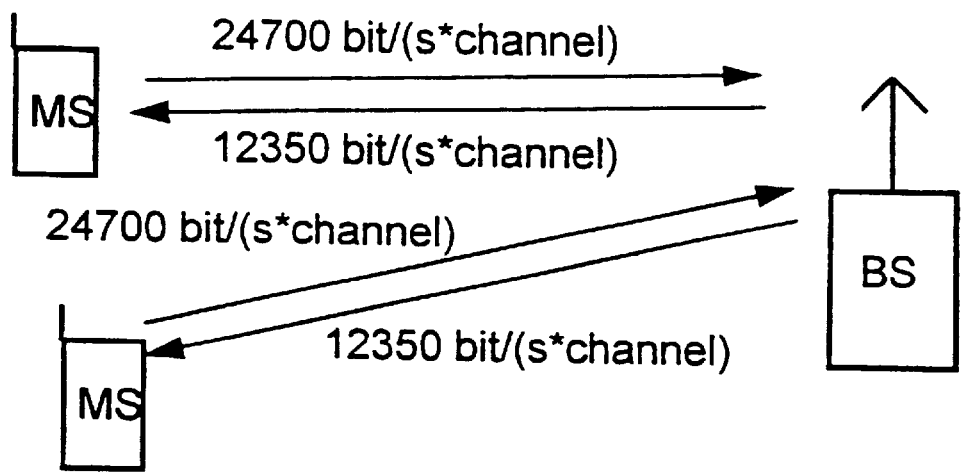

FIGS. 2 to 4 show different applications of a method for data transmission via an air interface between mobile stations MS and a base station BS. The applications differ in the data rates which are used for data transmission in the uplink or downlink directions.

FIG. 2 refers to data transmission between a base station BS and two mobile stations MS. Data rates of 24700 bits per s and channel are used both in the uplink direction and in the downlink direction. In this case, a channel is characterized by a frequency band and a time slot. Here, 24700 bit/s is the usual data rate for a channel of a GSM mobile radio network which has previously been used only by one mobile station MS. The total data rate transmitted via this channel is doubled by virtue of the fact that in this channel the data transmission of this data rate is possible to two mobile stations MS. Appropriate changes to the signal processing must be introduced for this purpose both in mobile stations MS and in the base station BS.

Double the data rate at 49400 bits per s and channel is allocated to a single mobile station in FIG. 3. This means that, as shown later, two training sequences are allocated to the link between the mobile station MS and base station BS both in the uplink direction and in the downlink direction. Adaptations of the signal processing are also to be undertaken in this case at the receiving end and at the transmitting end.

FIG. 4 shows a further application of the data transmission between a base station BS and two mobile stations MS, the mobile stations MS possibly being customary mobile stations previously used. Half the data rate at 12350 bit/s and channel is used in the downlink direction. This means, for example, that only each second time slot of the channel is evaluated by one mobile station in each case. The two mobile stations MS thus share a channel. However, in the uplink direction the two mobile stations MS simultaneously transmit on a channel with the usual bit rate. Only an adaptation of the base station BS need be performed in the case of this application.

Figure 5:
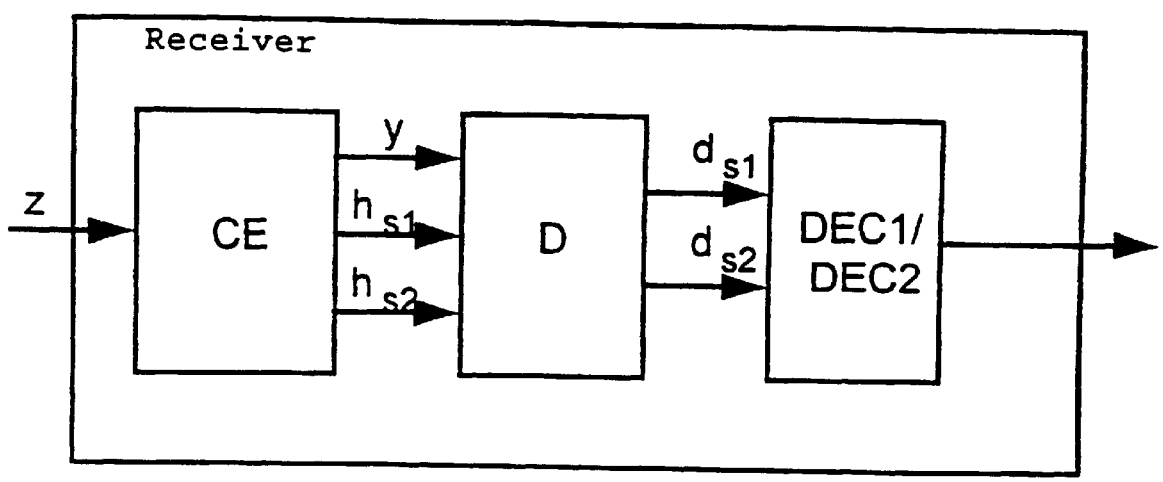
FIG. 5 is a block diagram of a receiver.

A receiver for carrying out the data transmission method is schematically illustrated in FIG. 5. The receiver includes a channel estimator CE and a detector D. The channel estimator receives antenna data z from a non-illustrated analog high-frequency unit which generates the antenna data as a complex base band signal. The channel estimator CE undertakes to synchronize the input data stream, with the result that a synchronized output data stream y is emitted.

Furthermore, for the purpose of simultaneous channel estimation for at least two message blocks transmitted simultaneously on the same channel, an evaluation of connection-specific training sequences tc1, tc2 transmitted in the message blocks in addition to the data d is evaluated in the channel estimator CE. This evaluation is used to determine the channel pulse responses of the two connections, which are likewise emitted by the channel estimator CE as channel coefficients $h_{s1}$, $h_{s2}$.

The detector D picks off the synchronized data y and the channel coefficients h, and carries out the data detection for both connections. The detected data $d_{s1}$, $d_{s2}$ for the two connections are present as a result of the data detection. The detected data $d_{s1}$, $d_{s2}$ are fed the further devices of the receiving radio station which thereupon carry out decoding and, if appropriate, further processing operations, for example decoding in decoders DEC1, DEC2, decryption, deinterleaving, etc. The symbols of the data $d_{s1}$, $d_{s2}$ represent the transmitted data d reconstructed by equalization and error correction.

Figure 6:
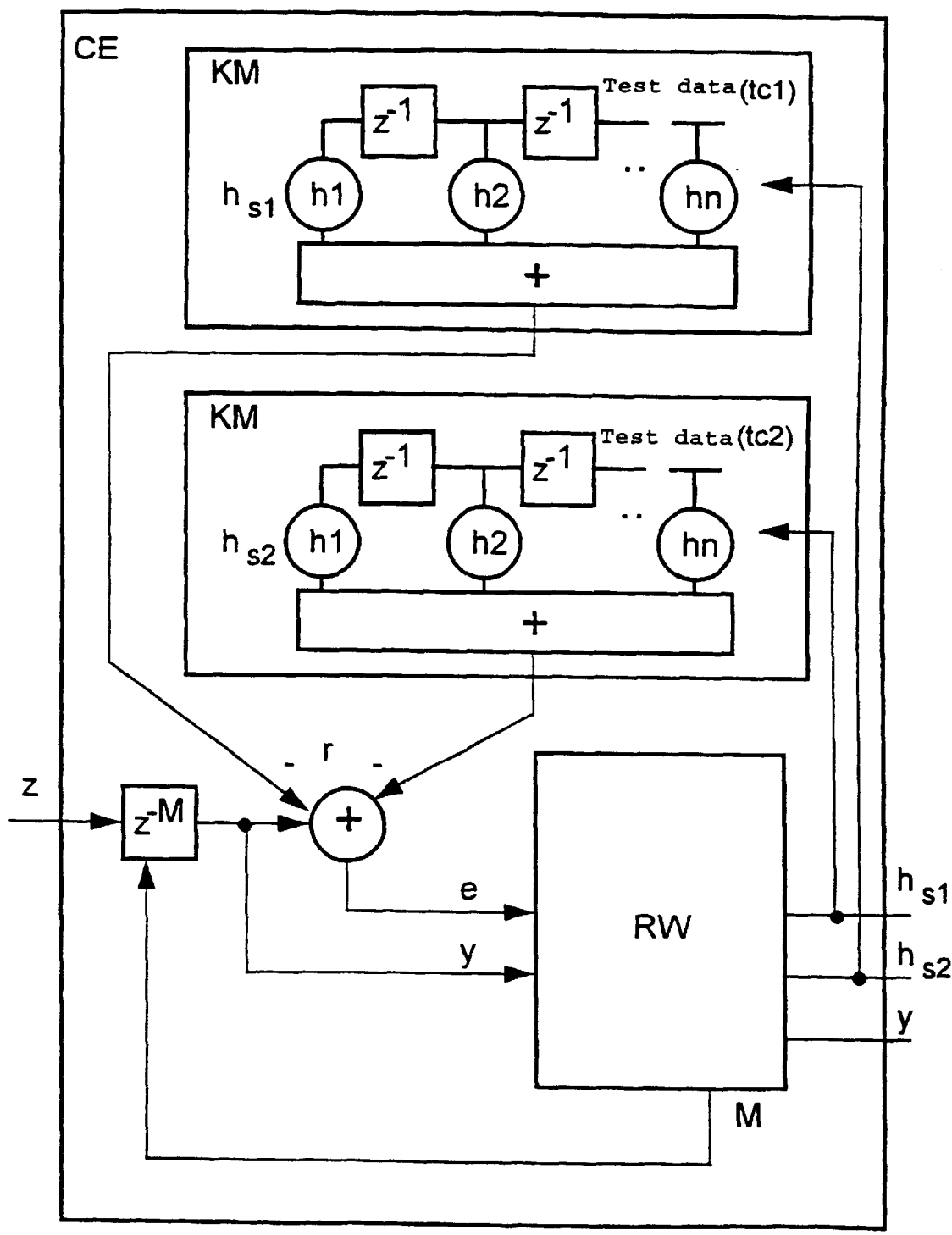
FIG. 6 is a schematic block diagram of a channel estimator.

The channel estimator CE is shown in FIG. 6. It includes two channel models KM which are intended to simulate the transmission conditions for the two connections. The channel models KM model delay elements $Z^{-1}$ which are arranged in chain form. Test data which correspond to the training sequences tc1, tc2 known at the receiving end are fed into the channel model and traverse these delay elements $Z^{-1}$. The non-delayed test data and the delayed test data present at the output of each delay element $Z^{-1}$ are respectively evaluated with a channel coefficient h (h1, h2, . . . hn) in an evaluation unit BE and subsequently summed to form model data r.

Multipath propagation is simulated in the channel models KM. Signal components arriving sequentially are superimposed to form a common signal. Three to four delay elements $Z^{-1}$ suffice to balance out this multipath propagation. The channel model KM is therefore implemented by a filter with a finite pulse response.

In order to set up the channel model, the data d of the two connections are grouped in a Toeplitz matrix in each case, the data of a first message block being part of the matrix $D_{s1}$, and the data of a second message block being part of the matrix $D_{s2}$.

$$\vec{D}_{s1} = \begin{bmatrix} d_5^{(s1)} & d_4^{(s1)} & \cdots & d_1^{(s1)} \\ d_6^{(s1)} & d_5^{(s1)} & \cdots & d_2^{(s1)} \\ d_7^{(s1)} & d_6^{(s1)} & \cdots & d_3^{(s1)} \\ \cdots & \cdots & \cdots & \cdots \end{bmatrix} \quad (1)$$

$$\vec{D}_{s2} = \begin{bmatrix} d_5^{(s2)} & d_4^{(s2)} & \cdots & d_1^{(s2)} \\ d_6^{(s2)} & d_5^{(s2)} & \cdots & d_2^{(s2)} \\ d_7^{(s2)} & d_6^{(s2)} & \cdots & d_3^{(s2)} \\ \cdots & \cdots & \cdots & \cdots \end{bmatrix} \quad (2)$$

Each of the connections can be described by a channel pulse response, the channel coefficients h of the first connection being described with a vector $h_{s1}$, and the channel coefficients of the second connection $h_{s2}$.

$$h_{s1} = \begin{bmatrix} h_1^{(s1)} \\ \cdots \\ h_5^{(s1)} \end{bmatrix} \quad (3)$$

$$h_{s2} = \begin{bmatrix} h_1^{(s2)} \\ \cdots \\ h_5^{(s2)} \end{bmatrix} \quad (4)$$

The synchronized received data y can therefore be described as follows:

$$\underline{y} = \vec{D}_{s1} \cdot \underline{h}_{s1} + \vec{D}_{s2} \cdot \underline{h}_{s2} = [\vec{D}_{s1} \ \vec{D}_{s2}] \cdot \begin{bmatrix} \underline{h}_{s1} \\ \underline{h}_{s2} \end{bmatrix} \quad (5)$$

The task of the channel estimator CE is to solve the equation (5) for the training sequences tc1, tc2 of the received message blocks. Assuming the channel model KM with five channel coefficients h permits the received data to be represented in accordance with equations (6) and (7), the exponent tc1 or tc2 indicates that the corresponding data are part of the training sequences tc1, tc2.

$$\vec{D}_{s1} = \begin{bmatrix} d_5^{(tc1)} & d_4^{(tc1)} & \cdots & d_1^{(tc1)} \\ d_6^{(tc1)} & d_5^{(tc1)} & \cdots & d_2^{(tc1)} \\ \cdots & \cdots & \cdots & \cdots \\ d_{26}^{(tc1)} & d_{25}^{(tc1)} & \cdots & d_{22}^{(tc1)} \end{bmatrix} \quad (6)$$

$$\vec{D}_{s2} = \begin{bmatrix} d_5^{(tc2)} & d_4^{(tc2)} & \cdots & d_1^{(tc2)} \\ d_6^{(tc2)} & d_5^{(tc2)} & \cdots & d_2^{(tc2)} \\ \cdots & \cdots & \cdots & \cdots \\ d_{26}^{(tc2)} & d_{25}^{(tc2)} & \cdots & d_{22}^{(tc2)} \end{bmatrix} \quad (7)$$

The following equation (8) is a representation of equation (5). A solution is possible with the aid of the criterion of least squares. In this case, there are 22 equations for 10 unknown channel coefficients h.

$$\left\| [\vec{D}_{s1} \ \vec{D}_{s2}] \cdot \begin{bmatrix} \underline{h}_{s1} \\ \underline{h}_{s2} \end{bmatrix} - \underline{y} \right\| = e = \min \quad (8)$$

Since the matrices $D_{s1}$ and $D_{s2}$ are independent of the input data, it is not necessary for the criterion of least square to be solved individually for each message block. The solution can be replaced by multiplying by a pseudoinverse of the matrix (exponent P) in accordance with the following equation:

$$\begin{bmatrix} \underline{h}_{s1} \\ \underline{h}_{s2} \end{bmatrix} = [\vec{D}_{s1} \ \vec{D}_{s2}]^{-P} \cdot \underline{y} \quad (9)$$

In order to synchronize the system of equations, a solution is found for each possible synchronization position of the message block. The synchronization position is symbolized by the variable M. The synchronization is finally carried out by a synchronization element $Z^{-M}$. The calculations described above are carried out by an arithmetic unit RW. The solution of the problem of least squares corresponds to minimizing the deviation e of received training sequences tc1, tc2 in relation to reference data r generated in at least two channel models KM.

Figure 7:
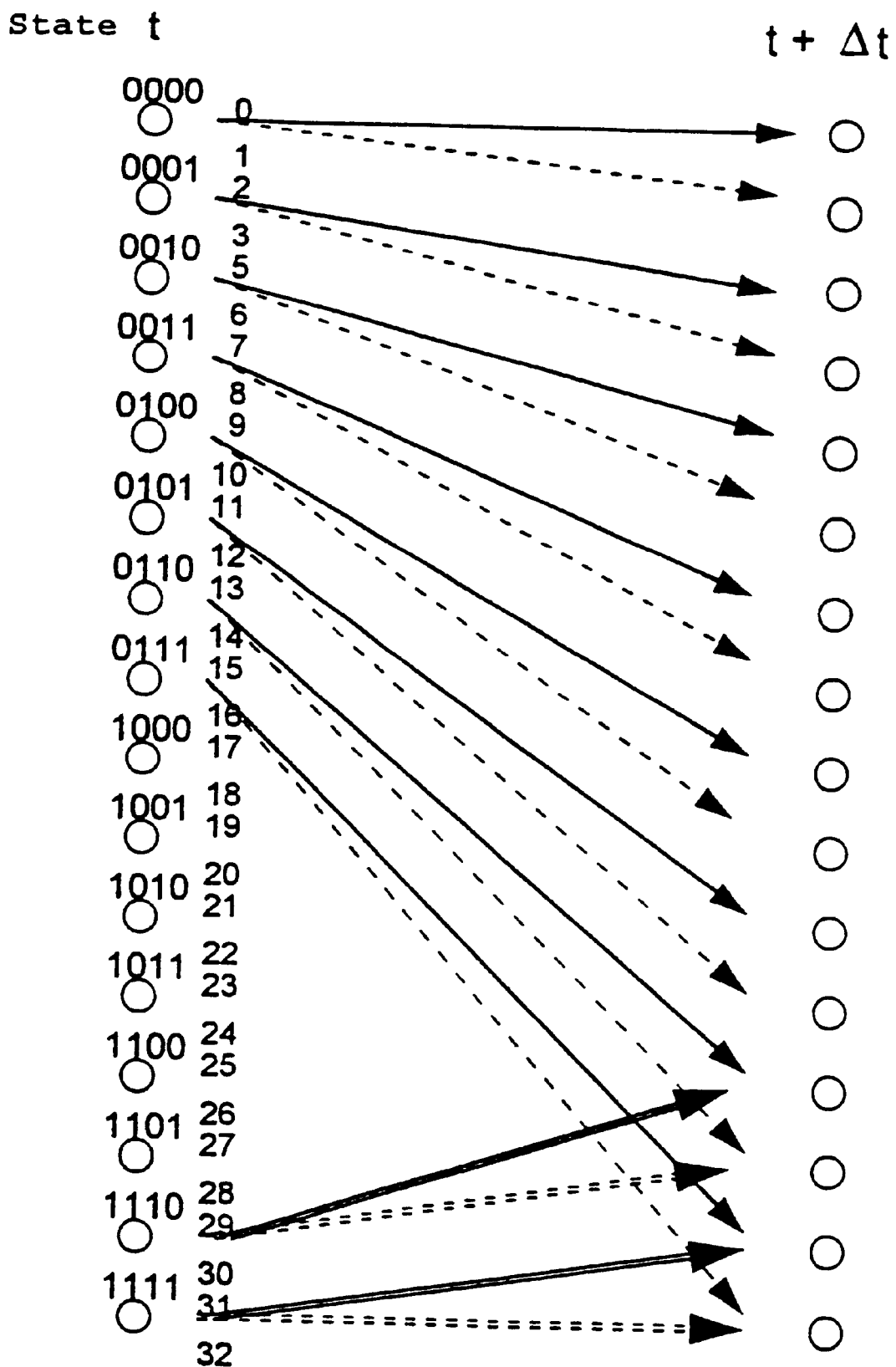
FIG. 7 is a state diagram for the data detection.

A Viterbi detector can be used as the detector D. In the case when a channel model KM is based on five channel coefficients h, this filter with a finite pulse response has a memory of four data symbols. Thus, when digital data are transmitted there is a possibility of 16 possible states in the past. Since a data symbol can specify two values (0 or 1), 32 transitions are possible from the state t to the state t+Δt. These transitions are shown in FIG. 7.

The states are represented as binary numbers, and the numbers of the transitions are specified next to the initial state. Continuous lines indicate that the last symbol had the value 0, and dashed lines indicate that the last symbol had the value 1. Lines drawn double lead to a decision for a symbol with the value 1, and lines drawn once lead to a decision for a symbol with the value 0.

The detector D takes account of two signals with in each case one channel model KM with five channel coefficients h. Consequently, there are 16 states in the past for signal 1 and 16 states for signal 2, that is to say the overall result is 256 possible states. If a further two new data symbols are received, this leads to 256 multiplied by four=1024 transitions.

Table 1 of FIG. 9 describes the relationship between the transmitted data symbol and a state number. The two signals have a memory of four symbols. X0 corresponds to the symbol of signal 1 last transmitted, and Y0 corresponds to the data symbol of signal 2 last transmitted. X3 and Y3 produce the reference to the data symbols received furthest back in the past. The values in the row above $y_i$ and $x_i$ must be added in order to obtain the state number.

The sequence 1000 1110 corresponds, for example, to the state 142. All the symbols x and all the symbols y are shifted to the left by one element in order to reach the next state. The data symbols x3 and y3 are not further taken into account, while x0 with y0 are filled up with the symbols last received.

The transition numbers can be derived from Table 2 shown in FIG. 10. The known "add compare select" operation of the Viterbi algorithm must be extended.

Figures 8, 12:
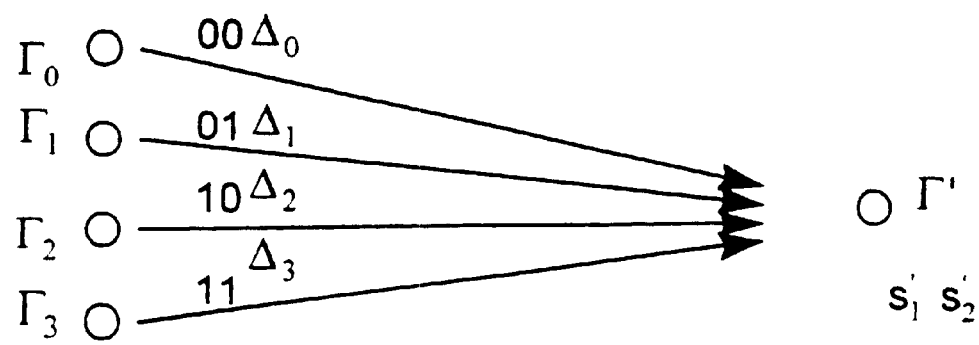
FIG. 8 is a schematic of a local "add compare select" operation with four transitions leading to one state.
FIG. 12 is a table with settings for soft output decisions in the decoders.

A local number is introduced in accordance with Table 3 and FIG. 8 for a local "add compare select" operation. Four transitions lead to one state. Each transition (FIG. 8: 00 01 10 11) starts with an initial state with the metric $\Gamma_i$. The term $\Gamma'$ is derived in this case in accordance with the following equation:

$$\Gamma' = \min(\Gamma_i + \Delta_i)|_{i=0\ldots3} \quad (10)$$

where $$\Delta_i = |y_i - r_i|^2 \quad (11)$$

The index i of the finally selected transition (minimum metric growth) is denoted by imin. In this case, $\Delta_i$ specifies the Euclidean distance between the complex received value $y_i$ and a complex reference value $r_i$. However, it is also possible for other distances to be used, for example a Hamming distance.

The reference value $r_i$ with i=0 . . . 1023 results from an addition of two convolution results of the values of all possible state numbers in accordance with Table 2 (10 bit→$2^{10}$=1024 possibilities), the values being transferred from the value range (0, 1) into the value range (−1, 1), with the corresponding values of the channel coefficients (2×5 bit) $h_{s1}$, $h_{s2}$.

The following remarks serve to determine the so-called soft outputs $s'_1$, $s'_2$—decisions provided with an item of reliability information. The data symbols x4 and y4 are defined for the transition imin. In order to reach the soft output for x4 ($s'_1$), the decision for y4 is assumed to be correct and constant, and the difference between the decision with x4=0 and x4=1 is evaluated. Equation (12) describes this calculation. The logic operators of the indices are derived from the programming language C.

$$s'_1 = (\Gamma_{imin\&2} + \Delta_{imin\&2}) - (\Gamma_{imin|1} + \Delta_{imin|1}) \quad (12)$$

The same procedure is applied for the data symbol y4. Equation (13) describes this:

$$s'_2 = (\Gamma_{imin\&1} + \Delta_{imin\&1}) - (\Gamma_{imin|2} + \Delta_{imin|2}) \quad (13)$$

For example, according to Table 4 "&2" means that the value for y4 is retained, and x4 is set to "0", and "|1" means that the value for y4 is retained and x4 is set to "1".

The soft outputs $s'_1$, $s'_2$ can be used in the decoder DEC1 or DEC2 to improve the decisions made. In addition to Viterbi decoders, it is also possible to use decoders for block codes.

I claim:

1. A method of transmitting data via an air interface between radio stations in a radio communications system, which comprises the following steps:

grouping data to be transmitted into message blocks at a transmitting end, the message blocks respectively containing additional symbols of a training sequence;

simultaneously transmitting at least two message blocks with mutually different training sequences on a channel designated by a frequency band and a time slot;

carrying out at least two channel estimates per channel at a receiving end with knowledge of the different training sequences; and respectively detecting the data of the at least two simultaneously transmitted message blocks for each channel based on the separate channel estimates.

2. The method according to claim 1, wherein the data of the at least two message blocks are detected at the receiving end.

3. The method according to claim 1, which comprises detecting the data of one message block at the receiving end, and using the knowledge of the further message block to improve the detection.

4. The method according to claim 1, which comprises synchronizing radio stations simultaneously transmitting on one channel.

5. The method according to claim 4, wherein the synchronizing step comprises setting a temporal deviation in an arrival of the at least two message blocks at the radio station at the receiving end which is smaller than a symbol length.

6. The method according to claim 1, which comprises synchronizing the data received at the receiving end.

7. The method according to claim 6, wherein the synchronizing step comprises setting a temporal deviation in an arrival of the at least two message blocks at the radio station at the receiving end which is smaller than a symbol length.

8. The method according to claim 1, which comprises allocating at least two training sequences to a transmitting radio station.

9. The method according to claim 1, which comprises transmitting with mobile stations or base stations of a digital mobile radio network.

10. The method according to claim 9, which comprises transmitting with different transmission rates in an uplink direction and in a downlink direction, respectively.

11. The method according to claim 10, which comprises using a message block with a higher data rate in the uplink direction than in the downlink direction.

12. The method according to claim 1, which comprises transmitting the data in accordance with a packet data service.

13. The method according to claim 1, wherein the detecting step comprises evaluating the at least two training sequences to obtain a message block-related channel estimation.

14. A receiving device for data transmitted via an air interface between radio stations in a radio communications system, comprising:

a channel estimator for simultaneous channel estimation of at least two message blocks simultaneously transmitted in one channel of an air interface designated by a frequency band and a time slot, said channel estimator evaluating for each channel at least two connection-specific training sequences transmitted within the message blocks in addition to the data, and determining channel coefficients in each case; and a detector connected to said channel estimator for respectively detecting data for the at least two message blocks with knowledge of the at least two separately determined channel coefficients.

15. The receiving device according to claim 14, wherein said channel estimator is programmed to simultaneously determine at least two sets of channel coefficients by minimizing, for received training sequences, a deviation of received data relative to reference data generated in at least two channel models with channel coefficients.

16. The receiving device according to claim 14, wherein said detector is programmed to consider at least four transitions from previous detection states $\Gamma_i$ to a new detection state $\Gamma'$ for applying Viterbi algorithm, and to determine the new detection state in accordance with the equation $\Gamma' = \min (\Gamma_i + \Delta_i)|_{i=...3}$, whereby $\Delta_i$ is a Euclidean spacing between a received symbol and a reference symbol.

17. The receiving device according to claim 16, which comprises at least one decoder adapted to take account of soft outputs $s'_1$, $s'_2$ calculated according to $$s'_1 = (\Gamma_{imin\&2} + \Delta_{imin\&2}) - (\Gamma_{imin|1} + \Delta_{imin|1}) \text{ and } s'_2 = (\Gamma_{imin\&1} + \Delta_{imin\&1}) - (\Gamma_{imin|2} + \Delta_{imin|2}).$$

18. In combination with a mobile station of a digital mobile radio network, the receiving device according to claim 14.

19. In combination with a base station of a digital mobile radio network, the receiving device according to claim 14.

* * * * *